United States Patent
Kozak

(10) Patent No.: US 11,221,626 B2
(45) Date of Patent: Jan. 11, 2022

(54) DRONE-BASED COLLECTION OF LOCATION-RELATED DATA

(71) Applicant: HERE Global B.V., Eindhoven (NL)

(72) Inventor: Frank Kozak, Chicago, IL (US)

(73) Assignee: HERE GLOBAL, B.V., Eindhoven (NL)

( * ) Notice: Subject to any disclaimer, the term of this patent is extended or adjusted under 35 U.S.C. 154(b) by 16 days.

(21) Appl. No.: 16/391,891

(22) Filed: Apr. 23, 2019

(65) Prior Publication Data

US 2020/0341471 A1 Oct. 29, 2020

(51) Int. Cl.
*G05D 1/00* (2006.01)
*B64C 39/02* (2006.01)
*G06T 7/20* (2017.01)
*H04W 4/029* (2018.01)
*G06K 9/00* (2006.01)

(52) U.S. Cl.
CPC ......... *G05D 1/0094* (2013.01); *B64C 39/024* (2013.01); *G06K 9/00369* (2013.01); *G06T 7/20* (2013.01); *H04W 4/029* (2018.02); *B64C 2201/123* (2013.01); *B64C 2201/127* (2013.01); *G06T 2207/30196* (2013.01)

(58) Field of Classification Search
CPC .............. G05D 1/0094; G05D 1/0684; B64C 2201/145; B64C 39/02; B64C 2201/123; B64C 2201/127; B64C 39/024; G01C 21/165; G01C 21/20; G06K 9/00369; G06K 9/0063; G06T 2207/30196; G06T 7/20; H04W 12/02; H04W 4/029; H04W 4/40
See application file for complete search history.

(56) References Cited

U.S. PATENT DOCUMENTS

| | | | |
|---|---|---|---|
| 6,798,357 B1 | 9/2004 | Khan | |
| 9,170,117 B1 * | 10/2015 | Abuelsaad | G01C 21/34 |
| 9,409,644 B2 | 8/2016 | Stanek et al. | |
| 9,429,425 B2 | 8/2016 | Tillmann | |
| 9,471,059 B1 * | 10/2016 | Wilkins | G05D 1/0094 |
| 9,718,564 B1 * | 8/2017 | Beckman | B64C 39/024 |
| 9,800,321 B2 | 10/2017 | Sham | |
| 9,817,396 B1 * | 11/2017 | Takayama | G06K 9/00637 |
| 9,826,415 B1 * | 11/2017 | Byrne | H04W 8/005 |

(Continued)

FOREIGN PATENT DOCUMENTS

| | | |
|---|---|---|
| CN | 106197464 A | 12/2016 |
| WO | WO 2017/038291 A1 | 3/2017 |
| WO | WO 2018/009190 A | 1/2018 |

OTHER PUBLICATIONS

Harik, E. H. C. et al., *Vision Based Target Tracking Using an Unmanned Aerial Vehicle*, IEEE International Workshop on Advanced Robotics and Its Social Impact (Jul. 2015) 7 pages.

*Primary Examiner* — Babar Sarwar
(74) *Attorney, Agent, or Firm* — Alston & Bird LLP

(57) ABSTRACT

A method, apparatus and computer program product are provided to collect additional location-related data. In the context of a method, for example, an entity in motion is identified and a drone is caused to accompany the entity that has been identified and to collect the location-related data while accompanying the entity. After having collected at least some location-related data, the method includes causing the drone to discontinue accompanying of the entity and to travel toward a destination.

24 Claims, 5 Drawing Sheets

(56) References Cited

U.S. PATENT DOCUMENTS

| | | | |
|---|---|---|---|
| 9,836,055 B1* | 12/2017 | Kim | G06F 3/017 |
| 9,952,594 B1* | 4/2018 | Zhao | G06K 9/00651 |
| 10,198,954 B2* | 2/2019 | Holtzman | G05D 1/0088 |
| 10,370,102 B2* | 8/2019 | Boykin | G06F 3/165 |
| 10,380,694 B1* | 8/2019 | Grant | G08G 1/205 |
| 10,492,012 B2* | 11/2019 | Cabouli | H04W 4/30 |
| 10,531,240 B1* | 1/2020 | Sciancalepore | H04W 4/029 |
| 10,696,397 B2* | 6/2020 | Sekine | G05D 1/0011 |
| 2010/0198514 A1* | 8/2010 | Miralles | F41G 7/2206 701/302 |
| 2010/0250022 A1* | 9/2010 | Hines | G05D 1/0094 701/2 |
| 2012/0050524 A1* | 3/2012 | Rinner | G06T 3/40 348/117 |
| 2012/0064855 A1* | 3/2012 | Mendelson | G06Q 90/20 455/404.2 |
| 2012/0262708 A1* | 10/2012 | Connolly | G05D 1/0094 356/237.2 |
| 2014/0254896 A1* | 9/2014 | Zhou | G06Q 20/3829 382/124 |
| 2015/0134143 A1* | 5/2015 | Willenborg | G05D 1/0094 701/2 |
| 2016/0304198 A1 | 10/2016 | Jourdan | |
| 2016/0306351 A1* | 10/2016 | Fisher | G05D 1/0016 |
| 2016/0340006 A1* | 11/2016 | Tang | B64C 39/024 |
| 2017/0086048 A1* | 3/2017 | Cho | G01S 19/17 |
| 2017/0092109 A1* | 3/2017 | Trundle | B60L 53/305 |
| 2017/0193820 A1 | 7/2017 | Sham | |
| 2017/0259920 A1* | 9/2017 | Lai | B64D 47/08 |
| 2017/0336203 A1* | 11/2017 | Barnes | G01C 11/34 |
| 2018/0041416 A1 | 2/2018 | Dorum | |
| 2018/0074518 A1* | 3/2018 | Cantrell | G05D 1/102 |
| 2018/0101173 A1* | 4/2018 | Banerjee | H04N 5/23248 |
| 2018/0155057 A1* | 6/2018 | Irish | G05D 1/0094 |
| 2018/0203470 A1* | 7/2018 | Pattison | B64D 47/04 |
| 2019/0072983 A1* | 3/2019 | Zhang | B64C 39/024 |
| 2019/0075543 A1* | 3/2019 | Kim | B64C 39/024 |
| 2019/0161103 A1* | 5/2019 | Venkatasubramanian | G05D 1/0094 |
| 2019/0178659 A1* | 6/2019 | DeLuca | G01C 21/3626 |
| 2019/0197646 A1* | 6/2019 | Prager | G05D 1/0094 |
| 2019/0227555 A1* | 7/2019 | Sun | G05D 1/0212 |
| 2020/0012829 A1* | 1/2020 | Davidson | G06K 19/06168 |
| 2020/0033128 A1* | 1/2020 | Baratz | G01C 21/165 |
| 2020/0046156 A1* | 2/2020 | Holzer | H04L 63/0442 |
| 2020/0130826 A1* | 4/2020 | Kozak | G08G 5/0069 |
| 2020/0132883 A1* | 4/2020 | Povar | G01W 1/08 |

* cited by examiner

DRONE-BASED COLLECTION OF LOCATION-RELATED DATA

TECHNOLOGICAL FIELD

A method, apparatus and computer program product are provided in accordance with an example embodiment in order to collect location-related data and, more particularly, to a method, apparatus, and computer program product for utilizing drones to collect location-related data.

BACKGROUND

Location-related data is utilized for a wide variety of purposes. For example, digital maps and other navigation applications use location-related data to provide accurate and up-to-date information to consumers of the digital maps or other navigation applications, such as vehicles, drivers, or the like. The location-related data may include not only information regarding the location of roads, trails or the like including, in some instances, lane-level information, but also information regarding a number of other parameters, such as information regarding traffic flow or congestion, information regarding the curvature of roads, information regarding the speed of travel along a road, information regarding road roughness and many other parameters utilized, for example, by mapping applications and for other navigational services.

Location-related data may be provided by a variety of sources. For example, dedicated vehicles may travel along roads to collect location-related data. These dedicated vehicles include a plurality of sensors, such as one or more cameras, one or more light detection and ranging (LIDAR) sensors, inertial sensors, temperature sensors, altimeters, one or more global positioning system (GPS) sensors (including assisted GPS sensors) or the like, in order to capture location-related data. While these dedicated vehicles collect a very robust set of located-related data, need for location-related data is great and deploying dedicated vehicles is relatively expensive. Thus, location-related data is also collected by other location-aware devices. For example, many privately owned or operated vehicles include a navigation system or other type of location-aware system that permits location-related data to be collected while the privately owned or operated vehicle travels along the roads. Further, a variety of mobile communication devices, such as mobile telephones, e.g. smartphones, smartwatches, personal navigation devices, tablet computers and the like, also include mapping or navigation systems or other location-aware systems such that these mobile communication devices may similarly collect location-related data as the person carrying the mobile device travels along various roads or other trails, such as on foot, in a vehicle, or otherwise.

These additional sources of location-related data increase the quantity of location-related data and, as a result, assist in maintaining the completeness, freshness and accuracy of the location-related data that is utilized by mapping and other navigational applications. However, these other sources of navigation-related data may be stationary or otherwise inaccessible for extended periods of time and, as such, may only sporadically provide useful location-related data. By way of example, a vehicle that includes a navigation or other location-aware system may oftentimes be parked, such as at a residence, an office or the like. While parked, the navigation or other location-aware system of the vehicle will not provide location-related data or at least will not provide location-related data that is not redundant with location-related data that has been previously provided. Similarly, a person that carries a mobile communication device that includes a navigation or other location-aware application may frequently be stationary, such as at a residence, an office or the like, such that the mobile communication device fails to provide useful location-related data for lengthy periods of time.

Furthermore, even in instances in which location-related data is collected by navigation or other location-aware systems onboard a vehicle or navigation or other location-aware applications executed by mobile communication devices, the location-related data may be proprietary or otherwise restricted. As such, the location-related data may not be available to a data collection entity that would otherwise utilize the location-related data to create and update digital maps and other related navigation information.

BRIEF SUMMARY

A method, apparatus and computer program product are provided in accordance with an example embodiment in order to provide for the collection of additional location-related data. By collecting additional location-related data, digital maps, navigation-related services and other location-aware applications may be constructed and updated in a more thorough manner, thereby increasing the accuracy, freshness and completeness of the location information provided by the mapping or navigation-related applications or other location-aware application. In some embodiments, the method, apparatus and computer program product are configured to collect the location-related data in a manner that maintains the privacy of a person associated with the location-related data that is collected.

In an example embodiment, a method is provided for collecting location-related data. The method includes identifying an entity in motion and causing a drone to accompany the entity that has been identified and to collect the location-related data while accompanying the entity. After having collected at least some location-related data, the method includes causing the drone to discontinue accompanying of the entity and to travel toward a destination.

The method of an example embodiment also includes causing the drone to be deployed from a vehicle prior to accompanying the entity in motion. In this example embodiment, the drone is caused to travel toward the destination by causing the drone to return to the vehicle from which the drone was deployed. In an example embodiment, the method also includes, while the drone is caused to travel toward the destination, identifying another entity in motion that is traveling at least partly toward the destination and causing the drone to accompany the another entity that has been identified and collect the location-related data while accompanying the another entity as the another entity travels at least partly toward the destination.

The method of an example embodiment identifies the entity in motion by utilizing image recognition to identify the entity in motion. In a method of an example embodiment, the entity in motion is identified by indicia carried by the entity in motion. In another embodiment, the method may identify the entity in motion based upon information provided by a mobile communications device carried by the entity in motion. The method of an example embodiment causes the drone to accompany the entity by causing the drone to detachably mount to or be carried by the entity while collecting the location-related data. In an example embodiment, the method also maintains the privacy of a person associated with the entity in motion, such as by implementing a privacy protocol that maintains the privacy of a person associated with the entity in motion while the drone collects the location-related data.

In another example embodiment, an apparatus is provided for collecting location-related data. The apparatus includes at least one processor and at least one non-transitory memory including computer program code instructions stored therein with the computer program code instructions configured to, when executed by the at least one processor, cause the apparatus at least to identify an entity in motion and to cause a drone to accompany the entity that has been identified and to collect the location-related data while accompanying the entity. After having collected at least some location-related data, the computer program code instructions are configured to, when executed by the at least one processor, cause the apparatus to cause the drone to discontinue accompanying of the entity and to travel toward a destination.

The computer program code instructions are also configured to, when executed by the at least one processor, cause the apparatus of an example embodiment to cause the drone to be deployed from a vehicle prior to accompanying the entity in motion. In this example embodiment, the drone is caused to travel toward the destination by causing the drone to return to the vehicle from which the drone was deployed. In an example embodiment, the computer program code instructions are also configured to, when executed by the at least one processor, cause the apparatus to, while the drone is caused to travel toward the destination, identify another entity in motion that is traveling at least partly toward the destination and to cause the drone to accompany the another entity that has been identified and collect the location-related data while accompanying the another entity as the another entity travels at least partly toward the destination.

The computer program code instructions are also configured to, when executed by the at least one processor, cause the apparatus of an example embodiment to identify the entity in motion by utilizing image recognition to identify the entity in motion. In one embodiment, the computer program code instructions are configured to, when executed by the at least one processor, cause the apparatus of an example embodiment to identify the entity in motion based upon indicia carried by the entity in motion. In another embodiment, the computer program code instructions may be configured to, when executed by the at least one processor, cause the apparatus to identify the entity in motion based upon information provided by a mobile communications device carried by the entity in motion. The computer program code instructions are configured to, when executed by the at least one processor, cause the apparatus of an example embodiment to cause the drone to accompany the entity by causing the drone to detachably mount to or be carried by the entity while collecting the location-related data. In an example embodiment, the computer program code instructions are also configured to, when executed by the at least one processor, cause the apparatus to maintain the privacy of a person associated with the entity in motion, such as by implementing a privacy protocol that maintains the privacy of a person associated with the entity in motion while the drone collects the location-related data.

In a further example embodiment, a computer program product is provided that is configured to collect location-related data. The computer program product includes at least one non-transitory computer-readable storage medium having computer-executable program code instructions stored therein with the computer-executable program code instructions including program code instructions configured to identify an entity in motion and to cause a drone to accompany the entity that has been identified and to collect the location-related data while accompanying the entity. After having collected at least some location-related data, the computer-executable program code instructions also include program code instructions configured to cause the drone to discontinue accompanying of the entity and to travel toward a destination.

The computer-executable program code instructions of an example embodiment also include program code instructions configured to cause the drone to be deployed from a vehicle prior to accompanying the entity in motion. In this example embodiment, the drone is caused to travel toward the destination by causing the drone to return to the vehicle from which the drone was deployed. In an example embodiment, the computer-executable program code instructions also include program code instructions configured to, while the drone is caused to travel toward the destination, identify another entity in motion that is traveling at least partly toward the destination and to cause the drone to accompany the another entity that has been identified and collect the location-related data while accompanying the another entity as the another entity travels at least partly toward the destination.

In an example embodiment, the program code instructions configured to identify the entity in motion include program code instructions configured to utilize image recognition to identify the entity in motion. In an example embodiment, the program code instructions configured to identify the entity in motion include program code instructions configured to identify the entity in motion based upon identification indicia carried by the entity in motion. In another embodiment, the program code instructions configured to identify the entity in motion may include program code instructions configured to identify the entity in motion based upon information provided by a mobile communications device carried by the entity in motion. In an example embodiment, the program code instructions configured to cause the drone to accompany the entity include program code instructions configured to cause the drone to detachably mount to or be carried by the entity while collecting the location-related data. In an example embodiment, the computer-executable program code instructions further include program code instructions configured to maintain the privacy of a person associated with the entity in motion, such as by implementing a privacy protocol that maintains the privacy of a person associated with the entity in motion while the drone collects the location-related data.

In yet another example embodiment, an apparatus is provided for collecting location-related data that includes means for identifying an entity in motion and means for causing a drone to accompany the entity that has been identified and to collect the location-related data while accompanying the entity. After having collected at least some location-related data, the apparatus also includes means for causing the drone to discontinue accompanying of the entity and to travel toward a destination.

The apparatus of an example embodiment also includes means for causing the drone to be deployed from a vehicle prior to accompanying the entity in motion. In this example embodiment, the drone is caused to travel toward the destination by causing the drone to return to the vehicle from which the drone was deployed. In an example embodiment, the apparatus also includes, while the drone is caused to travel toward the destination, means for identifying another entity in motion that is traveling at least partly toward the destination and means for causing the drone to accompany the another entity that has been identified and collect the location-related data while accompanying the another entity as the another entity travels at least partly toward the destination.

In an example embodiment, the means for identifying the entity in motion includes means for utilizing image recognition to identify the entity in motion. In an instance in which the entity in motion is a vehicle, the means for identifying the entity in motion includes means for identifying the vehicle based upon identification indicia carried by the vehicle. In another embodiment in which the entity in motion is a person, the means for identifying the entity in motion may include means for identifying the person based upon information provided by a mobile communications device carried by the person. In an example embodiment, the means for causing the drone to accompany the entity includes means for causing the drone to detachably mount to and be carried by the entity while collecting the location-related data. In an example embodiment, the apparatus further includes means for maintaining the privacy of a person associated with the entity in motion, such as by implementing a privacy protocol that maintains the privacy of a person associated with the entity in motion while the drone collects the location-related data.

In an example embodiment, a method is provided for collecting location-related data that includes determining whether an entity in motion is providing location-related data that is accessible to a data collection entity. In an instance in which the entity is not providing location-related data that is accessible, the method also includes causing a drone to accompany the entity in motion. While accompanying the entity in motion, the method further includes causing the drone to collect location-related data.

The method of an example embodiment causes the drone to accompany the entity in motion by causing the drone to maintain a line of sight with the entity in motion. The entity in motion may include a person, such as a pedestrian. After determining that the entity in motion is not providing location-related data that is accessible to the data collection entity, the method of an example embodiment also includes soliciting permission from the entity in motion to be accompanied by the drone and to provide the location-related data with subsequent collection of the location-related data by the drone based on receipt of the permission from the entity in motion. While accompanying the entity in motion, the method of an example embodiment also includes causing the drone to also collect the location-related data about one or more other entities in motion in proximity to the entity in motion. In an instance in which the entity is providing location-related data that is accessible, the method of an example embodiment also includes identifying another entity in motion for the drone to accompany and causing the drone to collect location-related data while accompanying the another entity. While accompanying the entity in motion, the method of an example embodiment also includes implementing a privacy protocol that maintains privacy of a person associated with the entity in motion.

In another example embodiment, an apparatus is provided that is configured to collect location-related data. The apparatus includes at least one processor and at least one non-transitory memory including computer program code instructions stored therein with the computer program code instructions configured to, when executed by the at least one processor, cause the apparatus at least to determine whether an entity in motion is providing location-related data that is accessible to a data collection entity. In an instance in which the entity is not providing location-related data that is accessible, the computer program code instructions are also configured to, when executed by the at least one processor, cause the apparatus to cause a drone to accompany the entity in motion. While accompanying the entity in motion, the computer program code instructions are further configured to, when executed by the at least one processor, cause the apparatus to cause the drone to collect location-related data.

The computer program code instructions are configured to, when executed by the at least one processor, cause the apparatus of an example embodiment to cause the drone to accompany the entity in motion by causing the drone to maintain a line of sight with the entity in motion. The entity in motion may include a person. After determining that the entity in motion is not providing location-related data that is accessible to the data collection entity, the computer program code instructions are further configured to, when executed by the at least one processor, cause the apparatus of an example embodiment to solicit permission from the entity in motion to be accompanied by the drone and to provide the location-related data with subsequent collection of the location-related data by the drone based on receipt of the permission from the entity in motion. While accompanying the entity in motion, the computer program code instructions are further configured to, when executed by the at least one processor, cause the apparatus of an example embodiment to cause the drone to also collect the location-related data about one or more other entities in motion in proximity to the entity in motion. In an instance in which the entity is providing location-related data that is accessible, the computer program code instructions are further configured to, when executed by the at least one processor, cause the apparatus of an example embodiment to identify another entity in motion for the drone to accompany and cause the drone to collect location-related data while accompanying the another entity. While accompanying the entity in motion, the computer program code instructions are further configured to, when executed by the at least one processor, cause the apparatus of an example embodiment to implement a privacy protocol that maintains privacy of a person associated with the entity in motion.

In a further example embodiment, a computer program product is provided that is configured to collect location-related data and that includes at least one non-transitory computer-readable storage medium having computer-executable program code instructions stored therein with the computer-executable program code instructions including program code instructions configured to determine whether an entity in motion is providing location-related data that is accessible to a data collection entity. In an instance in which the entity is not providing location-related data that is accessible, the computer-executable program code instructions also include program code instructions configured to cause a drone to accompany the entity in motion. While accompanying the entity in motion, the computer-executable program code instructions further include program code instructions configured to cause the drone to collect location-related data.

The program code instructions configured to cause the drone to accompany the entity in motion include, in one embodiment, program code instructions configured to cause the drone to maintain a line of sight with the entity in motion. The entity in motion may include a person, such as a pedestrian. After determining that the entity in motion is not providing location-related data that is accessible to the data collection entity, the computer-executable program code instructions of an example embodiment also include program code instructions configured to solicit permission from the entity in motion to be accompanied by the drone and to provide the location-related data with subsequent collection of the location-related data by the drone being based on receipt of the permission from the entity in motion. While accompanying the entity in motion, the computer-executable program code instructions of an example embodiment are further configured to cause the drone to also collect the location-related data about one or more other entities in motion in proximity to the entity in motion. In an instance in which the entity is providing location-related data that is accessible, the computer-executable program code instructions also include program code instructions configured to identify another entity in motion for the drone to accompany and to cause the drone to collect location-related data while accompanying the another entity. While accompanying the entity in motion, the computer-executable program code instructions also include program code instructions configured to implement a privacy protocol that maintains privacy of a person associated with the entity in motion.

In yet another example embodiment, an apparatus is provided for collecting location-related data that includes means for determining whether an entity in motion is providing location-related data that is accessible to a data collection entity. In an instance in which the entity is not providing location-related data that is accessible, the apparatus also includes means for causing a drone to accompany the entity in motion. While accompanying the entity in motion, the apparatus further includes means for causing the drone to collect location-related data.

In an example embodiment, the means for causing the drone to accompany the entity in motion include means for causing the drone to maintain a line of sight with the entity in motion. The entity in motion may include a person, such as a pedestrian. After determining that the entity in motion is not providing location-related data that is accessible to the data collection entity, the apparatus of an example embodiment also includes means for soliciting permission from the entity in motion to be accompanied by the drone and to provide the location-related data with subsequent collection of the location-related data by the drone being based on receipt of the permission from the entity in motion. While accompanying the entity in motion, the apparatus of an example embodiment also includes means for causing the drone to also collect the location-related data about one or more other entities in motion in proximity to the entity in motion. In an instance in which the entity is providing location-related data that is accessible, the apparatus of an example embodiment also includes means for identifying another entity in motion for the drone to accompany and means for causing the drone to collect location-related data while accompanying the another entity. While accompanying the entity in motion, the apparatus of an example embodiment also includes means for implementing a privacy protocol that maintains privacy of a person associated with the entity in motion.

In an example embodiment, a method is provided for collecting location-related data that includes determining whether an entity in motion is providing location-related data that is accessible to a data collection entity. In an instance in which the entity is providing location-related data that is accessible to the data collection entity, the method includes identifying another entity in motion for the drone to accompany and cause a drone to collect location-related data while accompanying the another entity.

The method of an example embodiment identifies another entity in motion for the drone to accompany by determining that the another entity is not providing location-related data that is accessible to the data collection entity prior to causing the drone to collect location-related data while accompanying the another entity. After determining that the entity in motion is not providing location-related data that is accessible to the data collection entity, the method of an example embodiment also includes soliciting permission from the entity in motion to be accompanied by the drone and to provide the location-related data with subsequent collection of the location-related data by the drone being based on receipt of the permission from the entity in motion. While accompanying the entity in motion, the method of an example embodiment further includes implementing a privacy protocol that maintains privacy of a person associated with the entity in motion while the drone accompanies the entity in motion. After having collected at least some location-related data, the method of an example embodiment further includes causing the drone to discontinue accompanying of the entity and to travel toward a destination. In an example embodiment, the method further includes identifying, while the drone is caused to travel toward the destination, an additional entity in motion that is not providing location-related data that is accessible and that is traveling at least partly toward the destination. The method of this example embodiment also includes causing the drone to accompany the additional entity that has been identified and collect the location-related data while accompanying the additional entity as the additional entity travels at least partly toward the destination.

In another example embodiment, an apparatus is provided that is configured to collect location-related data and that includes at least one processor and at least one non-transitory memory including computer program code instructions stored therein with the computer program code instructions configured to, when executed by the at least one processor, cause the apparatus at least to determine whether an entity in motion is providing location-related data that is accessible to a data collection entity. In an instance in which the entity is providing location-related data that is accessible to the data collection entity, the computer program code instructions are also configured to, when executed by the at least one processor, cause the apparatus to identify another entity in motion for the drone to accompany and to cause a drone to collect location-related data while accompanying the another entity.

In an example embodiment, the computer program code instructions configured to identify another entity in motion for the drone to accompany include computer program code instructions configured to determine that the another entity is not providing location-related data that is accessible to the data collection entity prior to causing the drone to collect location-related data while accompanying the another entity. After determining that the entity in motion is not providing location-related data that is accessible to the data collection entity, the computer program code instructions are also configured to, when executed by the at least one processor, cause the apparatus of an example embodiment to solicit permission from the entity in motion to be accompanied by the drone and to provide the location-related data with subsequent collection of the location-related data by the drone being based on receipt of the permission from the entity in motion. While accompanying the entity in motion, the computer program code instructions are further configured to, when executed by the at least one processor, cause the apparatus of an example embodiment to implement a privacy protocol that maintains privacy of a person associated with the entity in motion while the drone accompanies the entity in motion. After having collected at least some location-related data, the computer program code instructions are further configured to, when executed by the at least one processor, cause the apparatus of an example embodiment to cause the drone to discontinue accompanying of the entity and to travel toward a destination. In an example embodiment, the computer program code instructions are further configured to, when executed by the at least one processor, cause the apparatus of an example embodiment to identify, while the drone is caused to travel toward the destination, an additional entity in motion that is not providing location-related data that is accessible and that is traveling at least partly toward the destination. The computer program code instructions are further configured to, when executed by the at least one processor, cause the apparatus of this example embodiment to cause the drone to accompany the additional entity that has been identified and collect the location-related data while accompanying the additional entity as the additional entity travels at least partly toward the destination.

In a further example embodiment, a computer program product is provided that is configured to collect location-related data and that includes at least one non-transitory computer-readable storage medium having computer-executable program code instructions stored therein with the computer-executable program code instructions including program code instructions configured to determine whether an entity in motion is providing location-related data that is accessible to a data collection entity. In an instance in which the entity is providing location-related data that is accessible to the data collection entity, the computer-executable program code instructions also include program code instructions configured to identify another entity in motion for the drone to accompany and cause a drone to collect location-related data while accompanying the another entity.

In an example embodiment, the program code instructions configured to identify another entity in motion for the drone to accompany include program code instructions configured to determine that the another entity is not providing location-related data that is accessible to the data collection entity prior to causing the drone to collect location-related data while accompanying the another entity. After determining that the entity in motion is not providing location-related data that is accessible to the data collection entity, the program code instructions of an example embodiment are further configured to solicit permission from the entity in motion to be accompanied by the drone and to provide the location-related data with subsequent collection of the location-related data by the drone being based on receipt of the permission from the entity in motion. While accompanying the entity in motion, the program code instructions of an example embodiment are further configured to implement a privacy protocol that maintains privacy of a person associated with the entity in motion while the drone accompanies the entity in motion. In an example embodiment, the computer-executable program code instructions further include program code instructions configured, after having collected at least some location-related data while accompanying the entity, to cause the drone to discontinue accompanying of the entity and to travel toward a destination. The computer-executable program code instructions of an example embodiment further include program code instructions configured to identify, while the drone is caused to travel toward the destination, an additional entity in motion that is not providing location-related data that is accessible and that is traveling at least partly toward the destination and program code instructions configured to cause the drone to accompany the additional entity that has been identified and collect the location-related data while accompanying the additional entity as the additional entity travels at least partly toward the destination.

In yet another example embodiment, an apparatus is provided for collecting location-related data that includes means for determining whether an entity in motion is providing location-related data that is accessible to a data collection entity. In an instance in which the entity is providing location-related data that is accessible to the data collection entity, the apparatus includes means for identifying another entity in motion for the drone to accompany and cause a drone to collect location-related data while accompanying the another entity.

In an example embodiment, the means for identifying another entity in motion for the drone to accompany include means for determining that the another entity is not providing location-related data that is accessible to the data collection entity prior to causing the drone to collect location-related data while accompanying the another entity. After determining that the entity in motion is not providing location-related data that is accessible to the data collection entity, the apparatus of an example embodiment also includes means for soliciting permission from the entity in motion to be accompanied by the drone and to provide the location-related data with subsequent collection of the location-related data by the drone being based on receipt of the permission from the entity in motion. While accompanying the entity in motion, the apparatus of an example embodiment further includes means for implementing a privacy protocol that maintains privacy of a person associated with the entity in motion while the drone accompanies the entity in motion. After having collected at least some location-related data, the apparatus of an example embodiment further includes means for causing the drone to discontinue accompanying of the entity and to travel toward a destination. In an example embodiment, the apparatus further includes means for identifying, while the drone is caused to travel toward the destination, an additional entity in motion that is not providing location-related data that is accessible and that is traveling at least partly toward the destination. The apparatus of this example embodiment also includes means for causing the drone to accompany the additional entity that has been identified and collect the location-related data while accompanying the additional entity as the additional entity travels at least partly toward the destination.

BRIEF DESCRIPTION OF THE DRAWINGS

Figure 1:
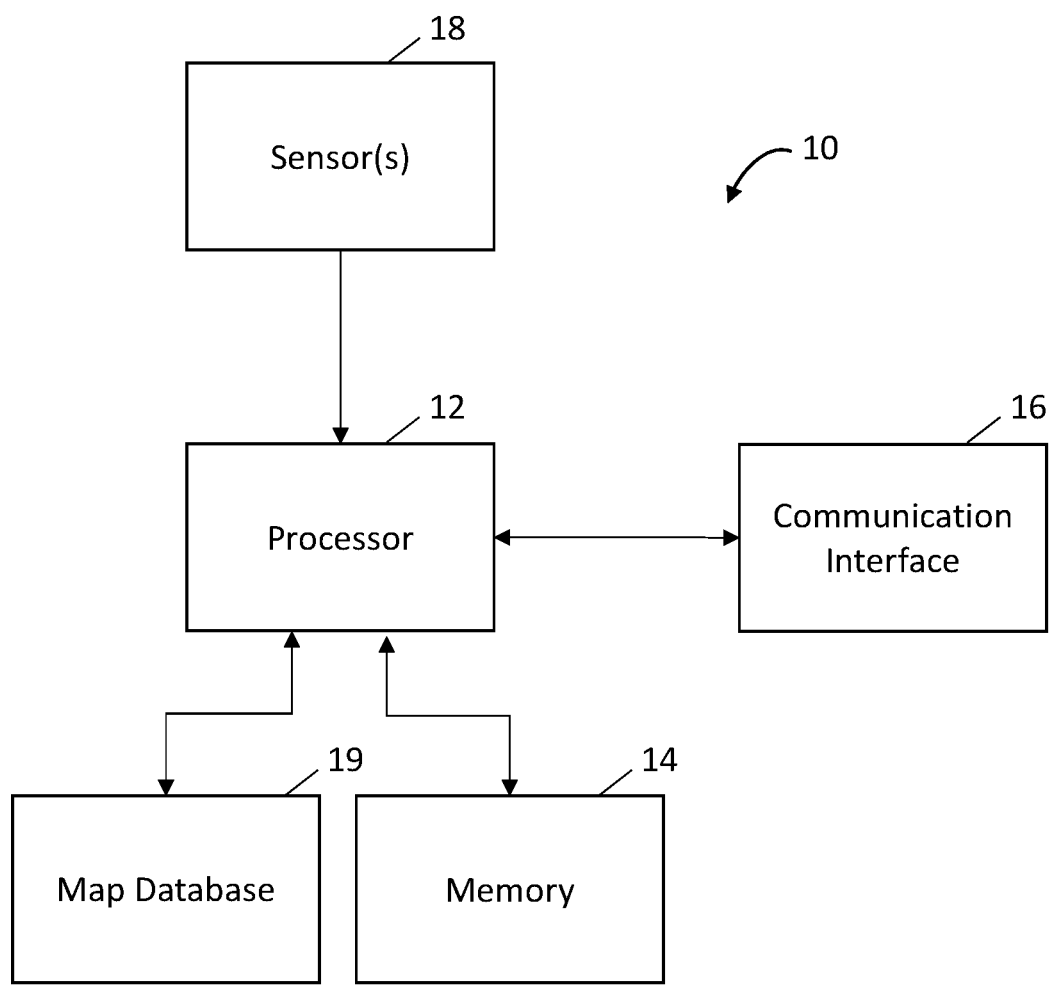
Figure 2:
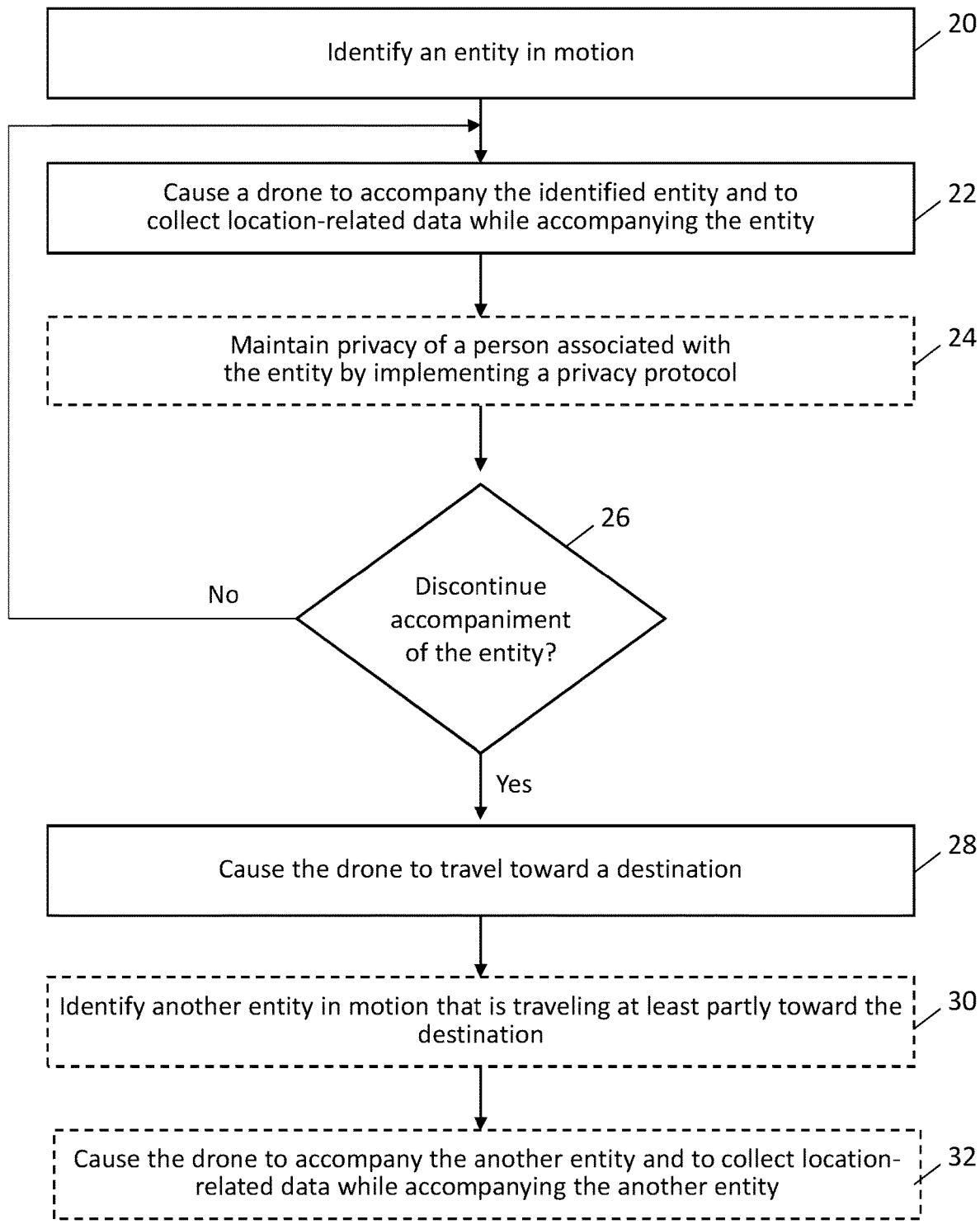
Figure 3:
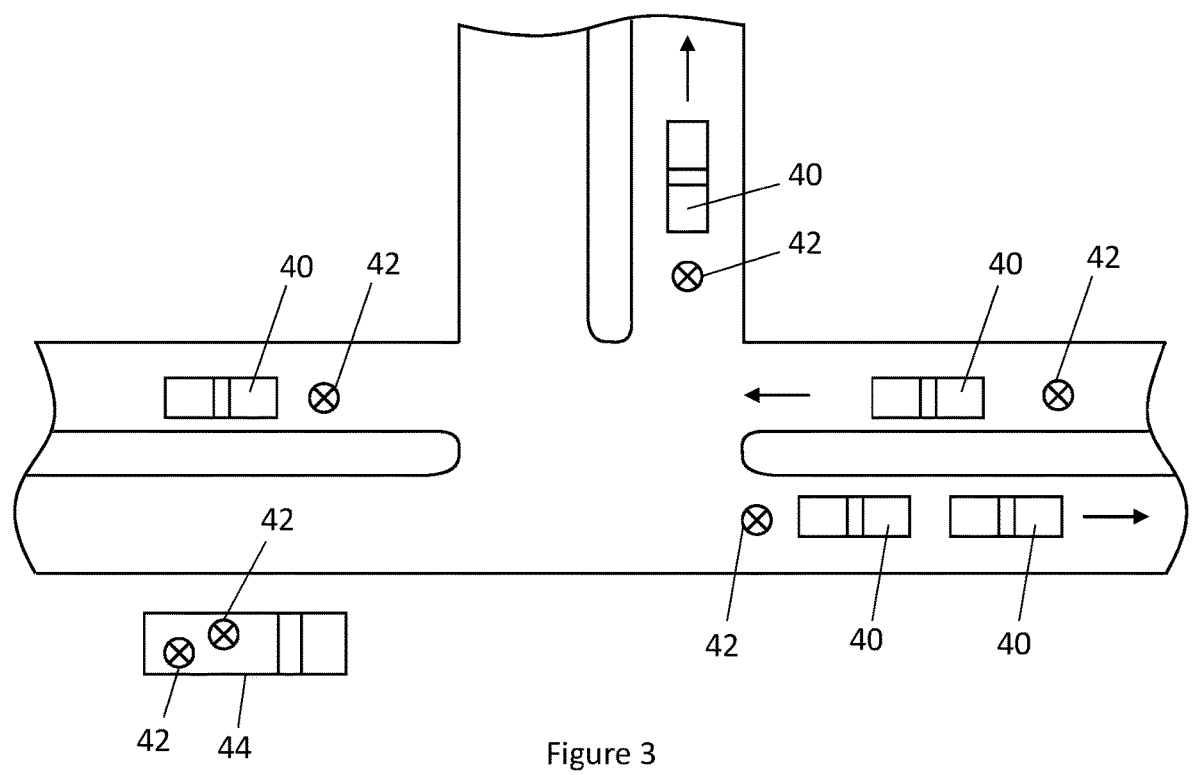
Figure 4:
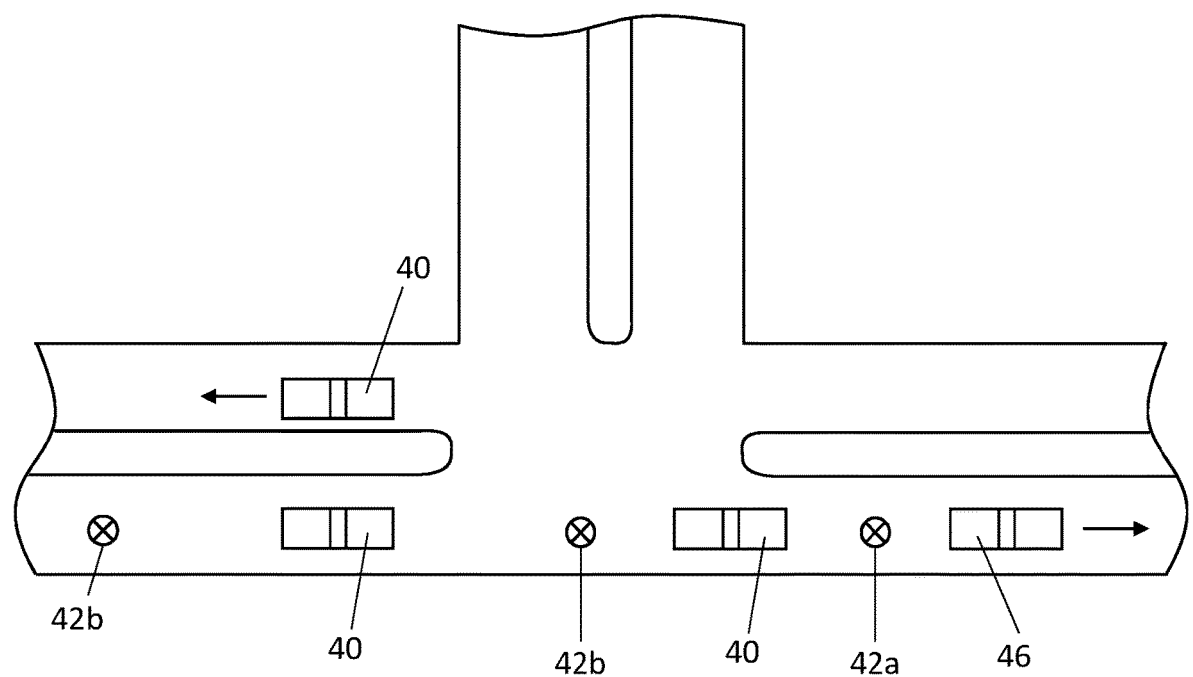
Figure 5:
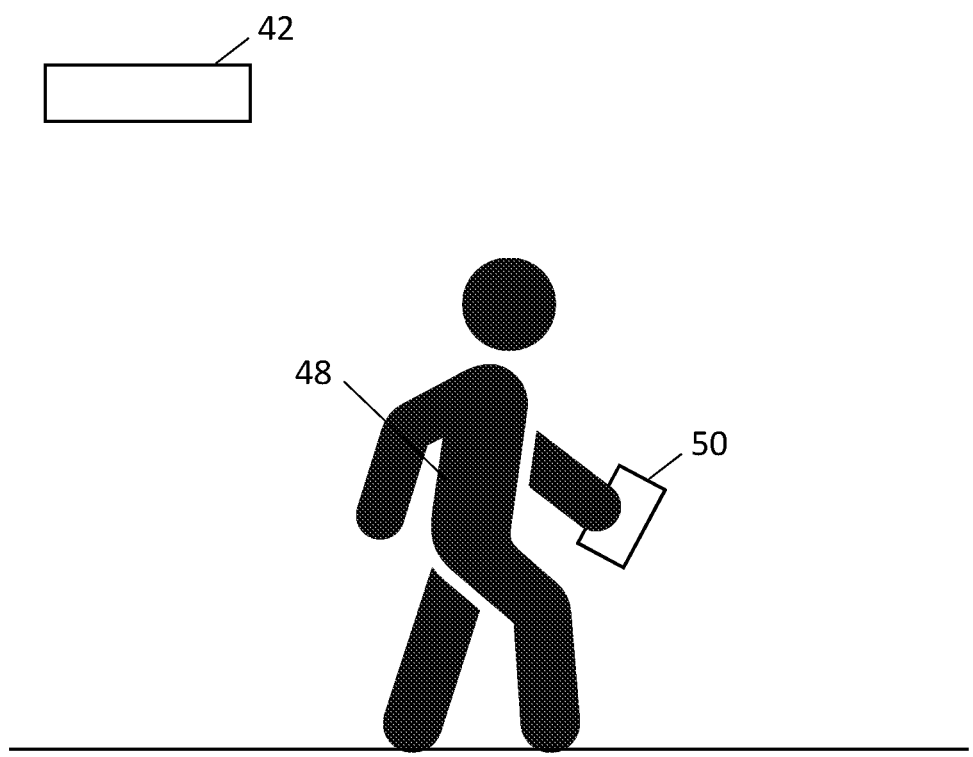
Figure 6:
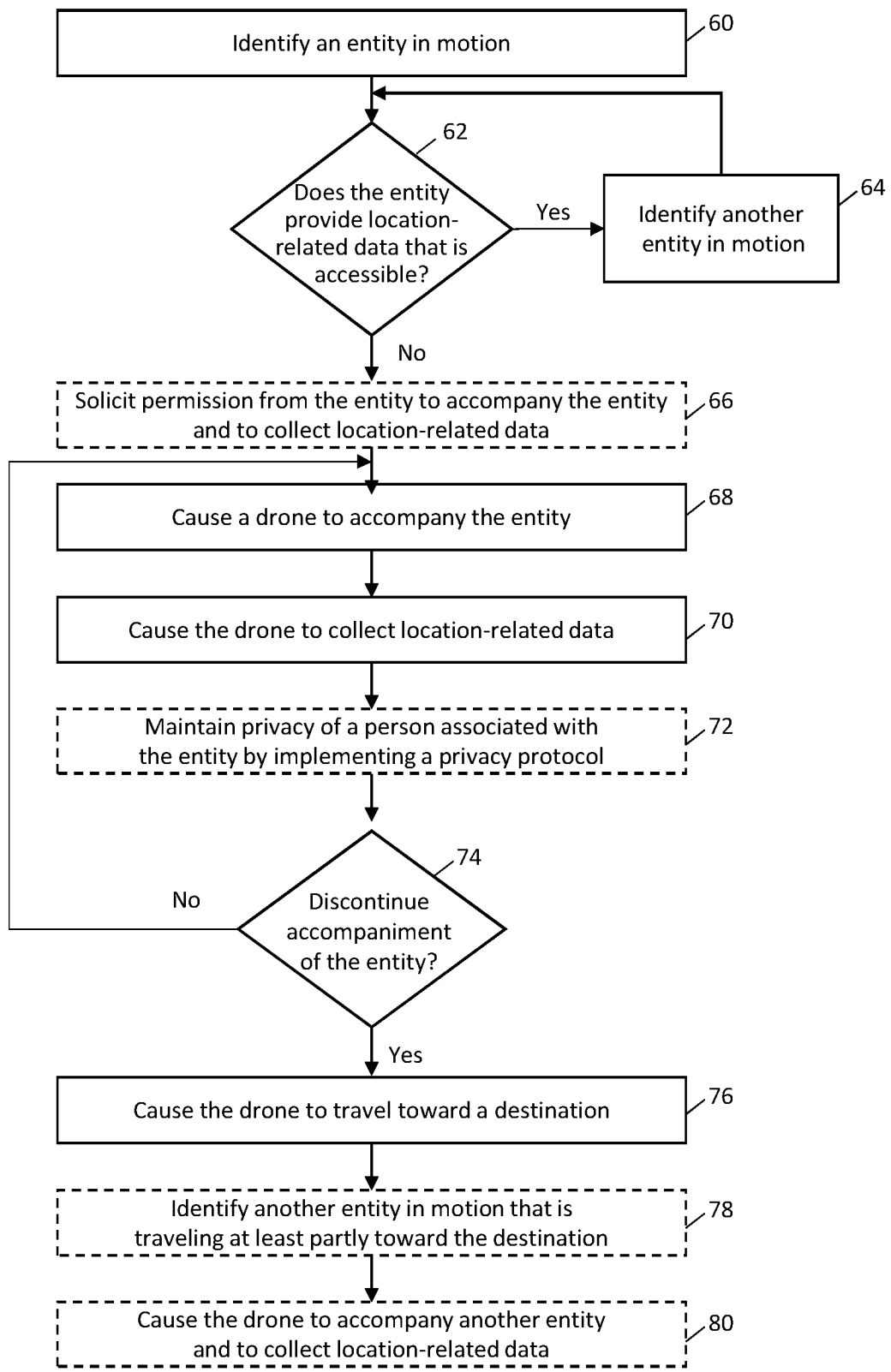

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present disclosure;

FIG. 2 is flow chart illustrating operations performed, such as by the apparatus of FIG. 1, in accordance with an example embodiment of the present disclosure;

FIG. 3 illustrates one or more drones accompanying respective vehicles in order to collect location-related data regarding the vehicles in accordance with an example embodiment of the present disclosure;

FIG. 4 illustrates a plurality of drones that follow a vehicle from which the drones were deployed and that are configured to collect location-related data regarding other vehicles on the road in accordance with an example embodiment of the present disclosure;

FIG. 5 illustrates a drone configured to accompany a person and to collect location-related data regarding the travels of the person in accordance with an example embodiment of the present disclosure; and FIG. 6 is a flow chart illustrating the operations performed, such as by the apparatus of FIG. 1, in accordance with another example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to utilize drones to collect location-related data. By utilizing drones to collect location-related data, the quantity of location-related data that is collected may be increased and the frequency and recency with which location-related data is collected may also be enhanced. By collecting additional quantities of location-related data and by collecting location-related data more frequently, location-aware applications, such as mapping and other navigation-related applications, that rely upon the location-related data may offer improved performance by correspondingly being more complete, accurate and up-to-date.

The drones that are utilized in accordance with an example embodiment may be any of a variety of unmanned air vehicles (UAVs) or other controllable flying objects. Alternatively, the drone may be a ground-based unmanned vehicle that is configured to travel along a road or other surface. The drones may be relatively small, such as by having a diameter or other cross-sectional dimension of less than two feet in some embodiments, less than one foot in other embodiments or even smaller in still further embodiments. As a result, drones are capable of accompanying various entities, such as vehicles or people as described below, in environments that provide only limited accessibility, such as by accompanying a vehicle that travels along a road or alley between buildings that defines a very narrow urban canyon through which the drone must navigate or by accompanying a person walking along a trail bounded by trees that define a only limited passage which the drone can navigate, even if the trail is not visible from above the tree line. By permitting the drone to accompany entities, such as vehicles or people in various environments including those in which the accessibility is limited, the method, apparatus and computer program product of an example embodiment provide for the fulsome collection of location-related data in a wide range of environments, thereby further increasing the accuracy and completeness of the location-related data provided to mapping and other navigation-related applications.

The location-related data collected by the drones and provided, for example, to mapping and other navigation-related applications may include any of a wide variety of location-related data. For example, the location-related data may include information regarding the location of a road or trail along which the entity that the drone accompanies travels. The location-related data may also include other parameters associated with the road or trail along which the entity travels. These other parameters may include by way of example, but not of limitation, information regarding the curvature of a road or trail, the slope, the dimensions, the altitude, signage, imagery, the roughness of the road, the speed of travel along the road or trail, the congestion or other traffic conditions along the road or trail or the like. Although described herein in conjunction with a road or trail, reference to a road or trail is provided by way of example but not of limitation as the drone may be configured to accompany the entity during other travels, such as by accompanying a boat, ferry or ship during travel along a waterway, accompanying a bicyclist during travel along a bike path or the like.

In order to control the drone during the collection of location-related data, an apparatus 10 is provided, such as depicted in FIG. 1. The apparatus may be embodied by any of a variety of computing devices including, for example, a computer, a mobile terminal, such as a personal digital assistant (PDA), mobile telephone, smart phone, personal navigation device, wearable device, smart watch and/or tablet computer, or a fixed computing device, such as a computer workstation, a navigation system or the like. In an example embodiment, however, the computing device is embodied and carried by the drone, such as in an instance in which the apparatus is embodied by the control system of the drone. Alternatively, the apparatus and, more particularly, the computing device that embodies the apparatus may be off board the drone, but may be in communication with the drone in order to facilitate control of the drone during the collection of the location-related data. And still other embodiments, the apparatus and, more particularly, the computing device that embodies the apparatus, may be distributed, such as in an instance in which at least a portion of the apparatus is onboard the drone and another portion of the apparatus is off board the drone, but in communication with a portion of the apparatus that is onboard the drone.

Regardless of the particular instantiation of the apparatus 10, the apparatus of an example embodiment depicted in FIG. 1 includes, is associated with or is otherwise in communication with a processor 12, a memory device 14 and optionally a communication interface 16. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment may also optionally include a communication interface 16 that may be any means such as a device or circuitry embodied in either hardware or a combination of hardware and software that is configured to receive and/or transmit data from/to other electronic devices in communication with the apparatus, such as other drones and/or a central site or central computer. Additionally or alternatively, the communication interface may be configured to communicate in accordance with various wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

The apparatus 10 of an example embodiment may also include one or more sensors 18, such as an image sensor, e.g., a camera or other image capture device, a radar sensor, an infrared sensor, a LIDAR sensor, an inertial sensor, a temperature sensor, an altimeter, a GPS sensor (including an assisted GPS sensor), a heat sensor, a vibration sensor, one or more accelerometers, one or more gyroscopes, a compass or the like. For example, in an embodiment in which the apparatus is embodied or carried by the drone, the drone may also include one or more sensors. However, the sensor(s) may, instead, be separate from the apparatus, but in communication with the apparatus, such as via the communication interface 16. For example, in an embodiment in which the apparatus is offboard, but in communication with the drone, the sensor(s) may be carried by the drone so as to be in communication with the apparatus via the communication interface.

The apparatus 10 of an example embodiment may also optionally include or be in communication with a map database 19 that represents road segments in a geographic area that may be utilized, for example, by a drone in order to facilitate its movements. In this regard, the map database contains map data that indicates attributes of the road segments. The map database may also include map data indicative of sidewalks or other types of pedestrian segments, as well as open areas, such as grassy regions or plazas.

The map database 19 may include node data, road segment data or link data, point of interest (POI) data, traffic data or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent bicycle lanes, pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. As noted below, the POIs stored by the map database may include a listing of candidate destinations, such as one or more of disposal sites, recycling centers, recharging stations or collection sites, along with the location and type of each destination. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 19 may be a master map database, such as a high definition (HD) map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device. The navigation-related functions can correspond to vehicle navigation, pedestrian navigation, or other types of navigation.

As mentioned above, the map database 19 may be a master geographic database, but in alternate or complementary embodiments, a client side map database may represent a compiled navigation database that may be used in or with a drone to provide navigation and/or map-related functions. In such a case, the map database can be downloaded or stored on the drone which can access the map database through a wireless or wired connection, such as a communications network.

With reference now to FIG. 2, the operations performed, such as by the apparatus 10 of FIG. 1, in accordance with an example embodiment in order to collect location-related data. As is shown in block 20, the apparatus includes means, such as the processor 12, one or more sensors 18 or the like, configured to identify an entity in motion. Various types of entities may be identified as being in motion including vehicles and people, such as pedestrians, bicyclists or the like. The apparatus, such as the processor, may be configured to identify the entity in motion in various manners. For example, the sensors of the apparatus may include a camera or other image capturing device(s) configured to capture an image of the entity in motion. The apparatus, such as the processor, of this example embodiment may also be configured utilize image recognition in order to uniquely identify the entity. This identification of the entity may be performed in various manners.

In an instance in which the entity is a vehicle, the apparatus 10, such as the processor 12, may employ image recognition in order to identify the vehicle based upon various visual characteristics of the vehicle including the color of the vehicle, the make of the vehicle, the model of the vehicle and/or other visible indicia, such as a bumper sticker, window decal, lettering or graphics on the body of the vehicle, a distinctive scratch or dent, the state of the license plate or the like. Additionally, or alternatively, the apparatus, such as the processor, may be configured to identify the entity in motion based upon indicia carried by the entity in motion. For example, in an instance in which the entity in motion is a vehicle, the apparatus, such as the processor, may be configured to identify the vehicle based upon identification indicia carried by the vehicle, such as the license plate number of the vehicle or a vehicle identification number provided by lettering on the body of the vehicle, such as the vehicle identification number that is presented by lettering on the body of taxis or commercial trucks.

By way of another example in which the entity in motion is a person, the apparatus 10, such as the processor 12, may also be configured to utilize image recognition in order to identify the person. In some embodiments, the apparatus, such as the processor, may not be configured to identify the person in terms of the actual identity of the person, but, instead, is configured to identify the person in such a manner, such as based upon the coloring and style of their clothing, their hair color and style, etc., so as to provide that the drone continues to follow the same person, regardless of their particular identity.

In some embodiments, the entity in motion, such as the person, that a drone accompanies (or a person in a vehicle or the vehicle itself that the drone accompanies) may carry a mobile communications device, such as a mobile telephone, e.g., smartphone, a smart watch, a personal navigation device or the like, that is configured to communicate with one or more networks including wide area networks, such as a cellular network, and/or one or more local area networks, such as established by Wi-Fi or other proximity based communication protocols, or to wirelessly communicate with one or more other local communication devices, such as via Bluetooth protocol or the like. In these embodiments, the apparatus 10 of an example embodiment may include means, such as the processor 12, the communication interface 16 or the like, configured to identify the entity in motion based upon the information provided by the mobile communication device carried by the entity in motion. For example, the mobile communication device may be uniquely identified from information provided by the mobile communication device in conjunction with the wireless communications, such as the information provided by the mobile communications device to a local area network, such as established by Wi-Fi, or to other local communication devices, such as to facilitate Bluetooth communication. Additionally or alternatively, the apparatus, such as the processor, may be configured to identify the person based upon information provided by the mobile communication device carried by the person in conjunction with communication by the mobile communication device via a cellular network, such as information provided by the mobile communication device that identifies the mobile communication device, at least temporarily, to the cellular network.

As shown in block 22 of FIG. 2, the apparatus 10 of this example embodiment also includes means, such as the processor 12, the one or more sensors 18 or the like, to cause a drone to accompany the entity in motion that has been identified and to collect location-related data while accompanying the entity. The drone may be caused to accompany the entity in various manners, but, in one embodiment, the drone is configured to fly overhead while maintaining the entity within an observational range to facilitate the collection of location-related data. In some embodiments, the drone is caused to fly, not only overhead, but in a trailing position relative to the entity during the collection of the location-related data.

The apparatus 10, such as the one or more sensors 18, is configured to collect a variety of location-related data including data relating to the location of the entity and, in some embodiments, location-related data regarding other parameters associated with the road or trail on which the entity travels and/or information regarding the traffic conditions or congestion along the road or trail. In addition to collecting location-related data, the one or more sensors of the apparatus may include a camera or other image capture device in order to capture images along the road or trail. For example, the apparatus may include one or more side-facing cameras in order to capture images along the road or other trail that may be utilized, for example, in conjunction with various mapping or other navigation-related applications.

One example of the manner in which the apparatus 10, such as the processor 12, is configured to cause a drone to accompany an entity in motion is depicted in FIG. 3. In this regard, the entities in motion include various vehicles 40 traveling along the road. The system depicted in FIG. 3 includes a plurality of drones 42. Some of the drones are depicted to accompany a respective vehicle as the vehicle travels along the roadway, such as by flying overhead in a trailing position behind the vehicle. In this example embodiment, the apparatus, such as the processor, is configured to cause the sensor(s) 18 onboard the drone to collect location-related data while accompanying the vehicle.

As shown in the example embodiment of FIG. 3, the apparatus 10 includes means, such as the processor 12, the one or more sensors 18 or the like, configured to collect location-related data not only regarding the entity in motion, but also about one or more other entities in motion that are proximate the entity accompanied by the drone. In this regard, the lower right portion of FIG. 3 depicts two vehicles 40 that are traveling in the same direction (to the right) and are closely spaced to one another. The apparatus, such as the processor, of this example embodiment may be configured to cause the drone 42 that accompanies one of the vehicles to also collect location-related data about the other vehicle of the closely bunched pair of vehicles, thereby facilitating the collection of additional location-related data by a single drone.

A drone 42 generally has a limited range. In this regard, the range of a drone is generally limited by the energy supply, such as fuel, batteries or the like, that powers the drone during flight. In order to facilitate the collection of location-related data at or near a particular location, such as along a relatively new stretch of road or near an intersection at which the signal lights or the lane markings have recently been modified, one or more drones may be transported to the location and may then be launched at the location in order to conserve the energy of the drone that otherwise would have been expended to travel to the location. As shown in FIG. 3, for example, a truck or other vehicle 44 may convey the drones to the location and the drones may then launch from the truck or other vehicle in order to collect location-related data. Once the location-related data has been collected and/or once the energy supply that powers a drone has reached a predefined lower limit, the apparatus 10, such as the processor 12, is configured to cause the drone of this example embodiment to return to the truck or other vehicle. Once onboard the truck or other vehicle, the drone may be recharged or refuelled and/or the drone may be transported to another location at which additional location-related data is to be collected.

In another example embodiment depicted in FIG. 4, one or more data collection vehicles 46 may travel along the roadways. These data collection vehicles may be particularly configured to collect location-related data including, in some embodiments, to capture images along the roadways. In some embodiments, a data collection vehicle may also serve to carry the drones to the location at which the drones will be deployed and to receive the returning drones following collection of the location-related data as described above in conjunction with the embodiment of FIG. 3. In this example embodiment, the apparatus 10, such as the processor 12, is configured to identify the data collection vehicle as the entity in motion and to then accompany the data collection vehicle while collecting location-related data. As shown in FIG. 4, a drone 42a is configured to accompany the data collection vehicle by flying overhead in a trailing position and to collect location-related data relating thereto. In an example embodiment, the apparatus, such as the processor, is configured to maintain the drone in a position relative to the data collection vehicle so as to have a line-of-sight to the data collection vehicle, such as determined by the analysis of images, for example, captured by a camera or other image collection device onboard the drone. The location-related data may be collected based upon one or more sensors 18 carried by the drone as described herein. Alternatively, the location-related data may be defined to be based on or the same as that collected by the data collection vehicle with the drone considered, for example, to travel on the same road and at the same speed as the data collection vehicle.

In the example embodiment depicted in FIG. 4, the system also includes one or more other drones 42b that follow the drone 42a associated with the data collection vehicle 46 and that maintain a line-of-sight with the drone that is associated with the data collection vehicle. However, these other drones need not necessarily maintain a line-of-sight with the data collection vehicle. These other drones are also configured to collect location-related data, thereby advantageously multiplying the quantity of the location-related data that is collected. As shown in the example embodiment of FIG. 4, these other drones that follow the drone associated with the data collection vehicle may, in some embodiments, collect location-related data regarding one or more other vehicles that are proximate these other drones, such as location-related data for one or more other vehicles that are following the data collection vehicle.

As depicted in FIG. 5, the entity in motion that the drone accompanies may be a person 48, such as a pedestrian or hiker, a bicyclist, a skateboarder or a person in motion. In this example embodiment, the apparatus 10, such as the processor 12, identifies the person as described above. In the embodiment of FIG. 5, for example, the person may carry a mobile communications device 50 such that the apparatus, such as the processor, is configured to identify the person based upon information provided by the mobile communications device. Once the person has been identified, the apparatus, such as the processor, is configured to cause the drone 42 to accompany the person while collecting location-related data, such as data defining the location of the person at various points in time and, in some embodiments, information regarding the speed with which the person is traveling.

As described, the apparatus 10, such as the processor 12, may be configured to cause the drone 42 to accompany the entity in motion by flying along with the entity. In some embodiments, however, the apparatus, such as the processor, is configured to cause the drone to land on the entity, such as the vehicle 40, in motion and to ride along with the entity. In this regard, the apparatus, such as the processor, may cause the drone to land on a vehicle, such as on the roof, trunk lid or bumper of the vehicle, and, in some embodiments, to be detachably secured to the vehicle, such as by means of one or more vacuum-assisted suction cups. By riding along with the vehicle, the energy expended by the drone while accompanying the entity and the collecting location-related data is significantly reduced, thereby extending the range and/or the useful lifetime of the drone. Further, the sensors 18, such as inertial sensors onboard the drone, are able to collect additional types of location-related data while riding on the vehicle that may not be collected or at least may not be collected as easily when flying along with the vehicle. In this regard, information regarding the roughness of the road and such other information regarding the inertial forces imparted upon the vehicle, such as during cornering, may be captured by sensors onboard the drone more accurately in an instance in which the drone is riding along with the vehicle.

In some embodiments, the apparatus 10 includes means, such as the processor 12, the communication interface 16 or the like, for communicating with the vehicle 40 or with a passenger in the vehicle in order to solicit permission for the drone 42 to land upon and ride along with the vehicle, such as prior to causing the drone to land upon and ride along with the vehicle. In this regard, a mapping or other navigation related application onboard the vehicle may support communication with the drone via which permission is requested for the drone to land upon the vehicle. Additionally or alternatively, a mobile communications device carried by a passenger in the vehicle may include an application that facilitates communication with the drone via which permission is requested to land upon and ride along with the vehicle. In this embodiment, in an instance in which the apparatus, such as the processor, the communication interface or the like, receives a response, such as from the vehicle or a passenger onboard the vehicle, granting permission for the drone to land upon or ride along with the vehicle, the apparatus, such as the processor, is configured to cause the drone to then land upon and ride along with the vehicle. However, in an instance in which the apparatus, such as the processor, the communication interface or the like, fails to receive a response or does receive a response that declines permission for the drone to land upon or ride along with the vehicle, the apparatus, such as the processor, is configured to cause the drone to accompany the vehicle by flying along with the vehicle without landing upon and riding along with the vehicle.

While the drone 42 accompanies the entity and collects location-related data, the apparatus 10 includes means, such as the processor 12 or the like, configured to determine whether the drone should discontinue its accompaniment of the entity. See block 26 of FIG. 2. This determination may be based upon any of a wide variety of factors. As noted above, for example, the drone may include a limited supply of energy. As such, the apparatus, such as the processor, may be configured to monitor the remaining energy supply onboard the drone and to determine that the drone should discontinue the accompaniment of the entity in an instance in which the remaining energy onboard the drone is no greater than a predetermined lower limit. Additionally or alternatively, a drone may be directed to accompany entities in motion and to collect location-related data within a predefined region, such as a region from which location-related data is desired. The region may be defined in various manners including a predefined distance from the point at which the drone was launched or based upon predefined boundaries. In this example embodiment, the apparatus, such as the processor, is configured to discontinue or to cause the drone to discontinue the accompaniment of the entity once the entity travels beyond the predefined region.

Still further, the apparatus 10, such as the processor 12, of another example embodiment may monitor the quantity of location-related data collected by the drone 42 during accompaniment of an entity in motion and may discontinue accompaniment of the entity once at least a predetermined quantity of location-related data has been collected. In yet another example embodiment, the apparatus, such as the processor, may be configured to determine an instance in which the entity is no longer in motion. In this regard, the apparatus, such as the processor, may determine that the entity is no longer in motion in an instance in which the entity has remained in the same position or has moved by no more than predefined distance for at least a predetermined period of time, such as in an instance in which the vehicle 40 that the drone has accompanied is now parked, such as at a residence or at an office, or in an instance in which a person 48 that the drone that accompanied has returned home or returned to work. In such an instance, the apparatus, such as the processor, is configured to discontinue the accompaniment of the entity once the entity has been determined to be stationary for at least a predetermined period of time.

Once the accompaniment of the entity has been discontinued, the apparatus 10 of an example embodiment includes means, such as the processor 12 or the like, configured to cause the drone 42 to travel towards a destination. See block 28 of FIG. 2. The drone may travel towards a variety of different destinations. As described above in conjunction with FIGS. 3 and 4, the destination may be a truck or other vehicle 44 from which the drone was deployed and which serves to collect the drones following the accompaniment of an entity in motion in order to recharge or refuel the drones and/or to convey the drones to another location. In other embodiments, however, the destination toward which a drone is caused to travel may be differently defined, such as a fixed destination or, in some embodiments, any one of a plurality of candidate destinations, such as refueling or recharging stations, such as may be defined by POIs stored by the map database 19. In an embodiment having a plurality of candidate destinations, the particular destination to which the drone is caused to travel may be determined in various manners, such as the destination from among the plurality of candidate destinations that is closest to the current location of the drone. In still other embodiments, the drone may be disposable, such that the destination to which the drone is caused to travel is any one of a plurality of disposal sites, such as a landfill, recycling center or a trash receptacle which may also be defined by POIs stored by the map database.

The location-related data collected while accompanying an entity in motion is typically transferred to an offboard computing device for storage, processing or the like. In some embodiments, the apparatus 10, such as the processor 12, the communication interface 16 or the like, is configured to cause the location-related data that is collected to be stored by the memory 14 and to then be downloaded to an offboard computing device, such as once the drone 42 reaches its destination, such as a truck or other vehicle 44 that transports the drones, or a refuelling or recharging station. In other embodiments, such as in instances in which the drone is disposable, the apparatus, such as the processor, the communication interface or the like, is configured to cause the location-related data to be transferred, such as for storage, further processing or the like, to an offboard computing device prior to reaching the destination, such as by transferring the location-related data while the drone accompanies an entity in motion and continues to collect additional location-related data.

In an example embodiment, while the drone 42 is traveling toward the destination, the apparatus 10 of an example embodiment may optionally be configured to include means, such as the processor 12, one or more sensors 18 or the like, configured to identify another entity in motion that is traveling at least partly toward the destination. See block 30 of FIG. 2. In this regard, the travel of the other entity at least partly toward the destination include another entity having a path of travel that includes at least one component that extends in a direction toward the destination such that by accompanying the other entity, the drone will travel to a location closer to the destination than its current location. With respect to the identification of the other entity, the apparatus, such as the processor, the one or more sensors or the like, may be configured to identify the other entity in any other manners described above. Once the other entity that is traveling at least partly toward the destination has been identified, the apparatus of this example embodiment may optionally include means, such as the processor or the like, configured to cause the drone to accompany the other entity and to collect location-related data while accompanying the other entity. See block 32. As such, the apparatus of this example embodiment is configured to collect additional location-related data, thereby further increasing the quantity and recency of the location-related data. Additionally, the collection of additional location-related data while the drone travels toward the destination increases the efficiency of operation of the drone and the efficiency with which the energy that powers the drone is utilized relative to the quantity of location-related data that is collected by the drone.

This optional identification of another entity and the accompaniment of the other entity in order to collect additional location-related data may be based on the drone 42 having at least a predetermined amount of energy or at least a predetermined remaining range so as to avoid instances in which the drone accompanies the another entity but fails to have sufficient energy to return to the destination following collection of the location-related data. In an instance in which the drone does accompany the other entity and as described above in conjunction with block 26, the apparatus 10, such as the processor 12, is configured to determine an instance in which the drone should discontinue its accompaniment of the other entity, such as in instances in which the energy onboard the drone reaches the predetermined lower limit, instances in which the other vehicle is no longer traveling toward the destination, instances in which the other entity is stationary for at least a predetermined time period or the like. In such instances, the apparatus, such as the processor, is configured to cause the drone to discontinue its accompaniment of the other entity and to travel at least partly toward the destination.

In some example embodiments, the drone 42 is not directed to follow any entity in motion, but to, instead, only follow an entity in motion that is not otherwise providing location-related data to a particular data collection entity, such as the data collection entity to which the location-related data collected by the drone is provided. By making the selection of the entity in motion that is to be followed by the drone based on the entity in motion not already providing location-related data to the data collection entity to which the location-related data collected by the drone is to be provided, the apparatus 10, such as the processor 12, of this example embodiment insures that the location-related data that is collected by the drone is not duplicative, but is additive and therefore supplements other location-related data provided to the data collection entity to which the location-related data collected by the drones is to be provided.

In this example embodiment, the apparatus 10 includes means, such as the processor 12, one or more sensors 18 or the like, configured to identify an entity in motion, such as a vehicle 40 or a person 48 as shown by block 60 of FIG. 6 and as described above in conjunction with block 20. In this example embodiment, the apparatus includes means, such as the processor or the like, configured to determine whether the entity in motion already provides location-related data that is accessible to the data collection entity to which the location-related data collected by the drone 42 is to be provided. See block 62. In this regard, the apparatus, such as the processor, may reference a listing of entities for which location-related data is provided to the data collection entity with the listing being stored by memory 14 or by a database offboard the drone but in communication with the apparatus, such as via the communication interface 16. Alternatively, the apparatus, such as the processor, the communication interface or the like, may be configured to communicate with the entity, such as via a mapping or navigation system onboard the vehicle 40 or a via mobile communication device 50 carried by a person 48 to determine the data collection entity, if any, to which location-related data associated with the entity is provided.

In an instance in which the apparatus 10, such as the processer 12, determines that the location-related data associated with the entity that has been identified is already being provided to and is accessible by the same data collection entity to which the location-related data collected by the drone 42 is to be provided, the apparatus includes means, such as the processor, one or more sensors 18 or the like, configured to identify another entity in motion and to then determine whether the location-related data associated with the other entity in motion is also already being provided to and accessible by the same data collection entity to which the location-related data collected by the drone is to be provided. See blocks 64 and 62 of FIG. 6. This process continues until an entity in motion is identified for which location-related data associated with the entity in motion is not already being provided to and accessible by the same data collection entity to which the location-related data collected by the drone is to be provided (regardless of whether location-related data associated with the entity in motion is being collected and provided to a different data collection entity).

As described above in conjunction with block 22 FIG. 2, the apparatus 10 of this example embodiment includes means, such as the processor 12 or the like, configured to cause the drone 42 to accompany the entity and means, such as the processor, one or more sensors 18 or the like, configured to cause the drone to collect location-related data. See blocks 68 and 70 of FIG. 6. Prior to causing the drone to accompany the entity and to collect location-related data, the apparatus of an example embodiment may optionally include means, such as the processor, the communication interface 16 or the like, for soliciting permission from the entity for the drone to accompany the entity and to collect location-related data with the subsequent accompaniment of the entity and the collection of location-related data being dependent upon the grant of permission. See block 66 of FIG. 6. Although permission may be granted simply because of a recognition of the value of the collection of additional location-related data, permission may be sometimes be granted due to the perception of security offered by the drone, such as in an instance in which the entity is a person 48 walking in an unfamiliar area. Additionally or alternatively, the apparatus, such as a processor, the communication interface or the like, may be configured to provide an incentive in conjunction with the solicitation of permission, such as by offering access to additional features provided by mapping or navigation system or the like. In an instance in which permission is not granted, the apparatus, such as the processor, is configured to identify another entity and to repeat this process. Although not described above in conjunction with FIG. 2, the embodiment of FIG. 2 may also optionally include means, such as the processor, the communication interface or the like, for soliciting permission from the entity for the drone to accompany the entity and to collect location-related data with the subsequent accompaniment of the entity and the collection of location-related data being dependent upon the grant of permission.

As described above in conjunction with blocks 26 and 28 of FIG. 2 and as shown in blocks 74 and 76 of FIG. 6, the apparatus 10 of an example embodiment may also include means, such as the processor 12 or the like, configured to determine whether the accompaniment of the entity is to be discontinued and, in an instance in which the drone 42 is determined to discontinue accompaniment of the entity, means, such as the processor or the like, configured to cause the drone to travel toward the destination. As also described above in conjunction with blocks 30 and 32 of FIG. 2 following the discontinuation of the accompaniment of the entity by the drone, the apparatus of this example embodiment may optionally include means, such as the processor, one or more sensors 18 or the like, configured to identify another entity in motion that is traveling at least partly toward the destination and means, such as the processor or the like, configured to cause the drone to accompany the another entity and to collect location-related data, thereby increasing the quantity and recency of the location-related data that is collected and also increasing the efficiency of operation of the drone relative to the location-related data that is collected. See blocks 78 and 80 of FIG. 6.

In any of the foregoing example embodiments, the apparatus 10 may include means, such as the processor 12 or the like, configured to maintain the privacy of a person associated with the entity. For example, the entity, such as a person or a vehicle, may be identified based upon visual characteristics that serve to distinguish the entity from other nearby entities, but that do not include personally identifiable information. For example, in an instance in which the entity is a vehicle, the vehicle may be identified based upon the color, make and model of the vehicle and the state of the license plate carried by the vehicle, but without taking into consideration any unique identifier, such as the license plate number of the vehicle. Similarly, in an instance in which the entity is a person, the person may be identified based upon their clothing, that is, the style of clothing, the color of clothing, etc. so as to distinguish the person from other nearby people, but the person may not be individually and specifically identified, such as through facial recognition, gait recognition or the like. As a result, the privacy of a person associated with the entity is maintained.

In other embodiments in which more specific personally identifiable information, such as a license plate number, a vehicle identification number painted on the vehicle or the identity of a person as defined through facial recognition, gait recognition or the like, is utilized in order to identify the entity, the information that serves to individually and specifically identify the person or the vehicle may not be transmitted offboard the drone 42 and may not be retained and may, instead, be deleted from memory 14 once the drone 42 no longer accompanies of the vehicle has been discontinued. In any event, the location-related data collected by the drone is not saved or subsequently processed in conjunction with any information identifying the entity that was accompanied during the collection of the location-related data. The particular manner in which the privacy of a person associated with the entity is maintained may be defined by a privacy protocol. In this regard, the privacy protocol may define the information that may be collected and relied upon in order to identify the entity in, in some instances, the information that is not to be collected or relied upon in identifying the entity. The privacy protocol may also define the manner in which any information that is collected to identify the entity is to be disposed of following the collection of the location-related data. Thus, the apparatus 10 of an example embodiment includes means, such as the processor 12 or the like, configured to implement the privacy protocol in order to maintain the privacy of a person associated with the entity. See block 24 of FIG. 2 and block 72 of FIG. 6.

As described above, a method, apparatus 10 and computer program product are provided to collect additional location-related data. By collecting additional location-related data, digital maps, navigation-related services and other location-aware applications may be constructed and updated in a more thorough manner, thereby increasing the accuracy and completeness of the location information provided by the mapping or navigation-related applications or other location-aware application. In some embodiments, the method, apparatus and computer program product are advantageously configured to collect the location-related data in a manner that maintains the privacy of a person associated with the location-related data that is collected.

FIGS. 2 and 6 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by a processor 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included, such as represented by the blocks outlined in dashed lines in FIGS. 2 and 6. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for collecting location-related data associated with an entity, the method comprising:
    identifying the entity in motion;
    causing a drone to accompany the entity that has been identified and to collect the location-related data while accompanying the entity;
    after having collected at least some location-related data associated with the entity, determining whether the drone discontinues accompanying of the entity by monitoring a quantity of the location-related data collected by the drone during accompaniment of the entity and determining whether at least a predetermined quantity of the location-related data has been collected; and
    causing the drone to discontinue accompanying of the entity and to travel toward a destination based on a determination that at least the predetermined quantity of the location-related data has been collected.

2. The method according to claim 1 further comprising causing the drone to be deployed from a vehicle prior to accompanying the entity in motion, and wherein causing the drone to travel toward the destination comprises causing the drone to return to the vehicle from which the drone was deployed.

3. The method according to claim 1 further comprising:
    while the drone is caused to travel toward the destination, identifying another entity in motion that is traveling at least partly toward the destination; and
    causing the drone to accompany the another entity that has been identified and collect the location-related data while accompanying the another entity as the another entity travels at least partly toward the destination.

4. The method according to claim 1 wherein identifying the entity in motion comprises utilizing image recognition to identify the entity in motion.

5. The method according to claim 1 wherein identifying the entity in motion comprises identifying the entity in motion based upon indicia carried by the entity in motion.

6. The method according to claim 1 wherein the entity in motion comprises a pedestrian.

7. The method according to claim 1 wherein identifying the entity in motion comprises identifying the entity in motion based upon information provided by a mobile communications device carried by the entity in motion.

8. The method according to claim 1 wherein causing the drone to accompany the entity comprises causing the drone to detachably be carried by the entity while collecting the location-related data.

9. The method according to claim 1 further comprising maintaining privacy of a person associated with the entity in motion.

10. The method according to claim 9 further comprising implementing a privacy protocol that maintains the privacy of a person associated with the entity in motion while the drone collects the location-related data.

11. An apparatus comprising at least one processor and at least one non-transitory memory including computer program code instructions stored therein, the computer program code instructions configured to, when executed by the at least one processor, cause the apparatus at least to:
    determine whether an entity in motion is providing location-related data that is accessible to a data collection entity to which the location-related data collected by a drone is to be provided;
    in an instance in which the entity is not providing the location-related data that is accessible, cause the drone to accompany the entity in motion; and
    while accompanying the entity in motion, cause the drone to collect the location-related data from the entity.

12. The apparatus according to claim 11 wherein the computer program code instructions are configured to, when executed by the at least one processor, cause the apparatus to cause the drone to accompany the entity in motion by causing the drone to maintain a line of sight with the entity in motion.

13. The apparatus according to claim 11, wherein the entity in motion comprises a pedestrian.

14. The apparatus according to claim 11, wherein, in response to determining that the entity in motion is not providing the location-related data that is accessible to the data collection entity, the computer program code instructions are further configured to, when executed by the at least one processor, cause the apparatus to solicit permission from the entity in motion to be accompanied by the drone and to provide the location-related data with subsequent collection of the location-related data by the drone being based on receipt of the permission from the entity in motion.

15. The apparatus according to claim 11 wherein, while accompanying the entity in motion, the computer program code instructions are further configured to, when executed by the at least one processor, cause the apparatus to cause the drone to also collect the location-related data about one or more other entities in motion in proximity to the entity in motion.

16. The apparatus according to claim 11 wherein, in an instance in which the entity is providing the location-related data that is accessible, the computer program code instructions are further configured to, when executed by the at least one processor, cause the apparatus to identify another entity in motion for the drone to accompany and cause the drone to collect location-related data associated with the another entity while accompanying the another entity.

17. The apparatus according to claim 11 wherein, while accompanying the entity in motion, the computer program code instructions are further configured to, when executed by the at least one processor, cause the apparatus to implement a privacy protocol that maintains privacy of a person associated with the entity in motion.

18. A computer program product comprising at least one non-transitory computer-readable storage medium having computer-executable program code instructions stored therein, the computer-executable program code instructions comprising program code instructions configured to:

determine whether an entity in motion is providing location-related data that is accessible to a data collection entity to which the location-related data collected by a drone is to be provided; and in an instance in which the entity is providing the location-related data that is accessible to the data collection entity, identify another entity in motion for the drone to accompany and cause the drone to collect location-related data associated with the another entity while accompanying the another entity.

19. The computer program product according to claim 18 wherein the program code instructions configured to identify another entity in motion for the drone to accompany comprise program code instructions configured to determine that the another entity is not providing the location-related data associated with the another entity that is accessible to the data collection entity prior to causing the drone to collect the location-related data associated with the another entity while accompanying the another entity.

20. The computer program product according to claim 18, wherein, after determining that the entity in motion is not providing the location-related data that is accessible to the data collection entity, the program code instructions are further configured to solicit permission from the entity in motion to be accompanied by the drone and to provide the location-related data with subsequent collection of the location-related data by the drone being based on receipt of the permission from the entity in motion.

21. The computer program product according to claim 18 wherein, while accompanying the entity in motion, the program code instructions are further configured to implement a privacy protocol that maintains privacy of a person associated with the entity in motion while the drone accompanies the entity in motion.

22. The computer program product according to claim 18 wherein the computer-executable program code instructions further comprise program code instructions configured, after having collected at least some location-related data while accompanying the entity, to cause the drone to discontinue accompanying of the entity and to travel toward a destination.

23. The computer program product according to claim 22 wherein the computer-executable program code instructions further comprise program code instructions configured to:

while the drone is caused to travel toward the destination, identify an additional entity in motion that is not providing location-related data associated with the additional entity that is accessible and that is traveling at least partly toward the destination; and cause the drone to accompany the additional entity that has been identified and collect the location-related data associated with the additional entity while accompanying the additional entity as the additional entity travels at least partly toward the destination.

24. The computer program product according to claim 18 wherein the computer-executable program code instructions further comprise program code instructions configured, in an instance in which the entity is not providing the location-related data that is accessible to the data collection entity, cause the drone to accompany the entity and to collect the location-related data while accompanying the entity.

\* \* \* \* \*

UNITED STATES PATENT AND TRADEMARK OFFICE
CERTIFICATE OF CORRECTION

PATENT NO. : 11,221,626 B2
APPLICATION NO. : 16/391891
DATED : January 11, 2022
INVENTOR(S) : Frank Kozak It is certified that error appears in the above-identified patent and that said Letters Patent is hereby corrected as shown below:

On the Title Page

Item (73) Assignee: "HERE GLOBAL, B.V., Eindhoven (NL)" should read -- HERE GLOBAL B.V., Eindhoven (NL) --

Signed and Sealed this
Thirteenth Day of December, 2022

*Katherine Kelly Vidal*

Katherine Kelly Vidal
*Director of the United States Patent and Trademark Office*